2,250,614

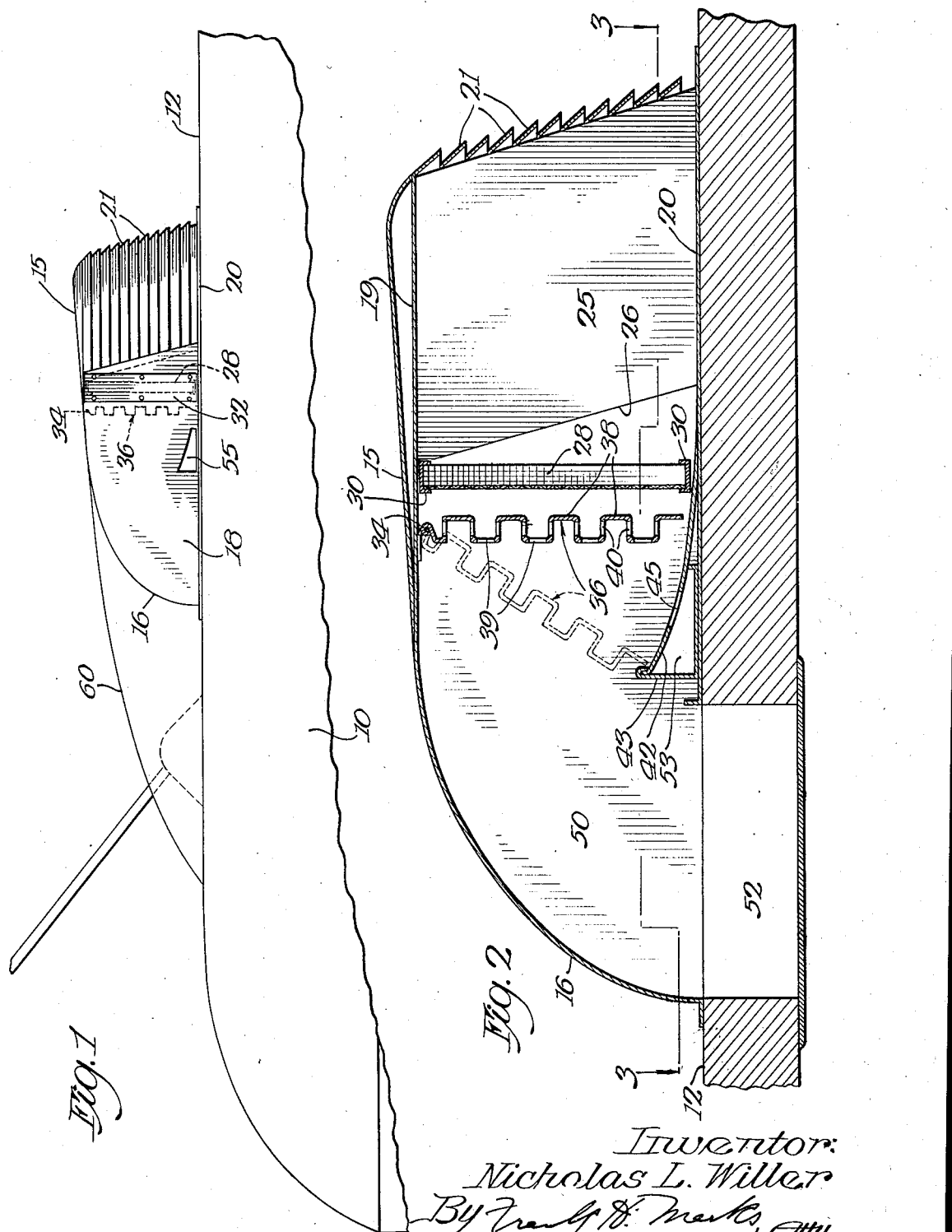

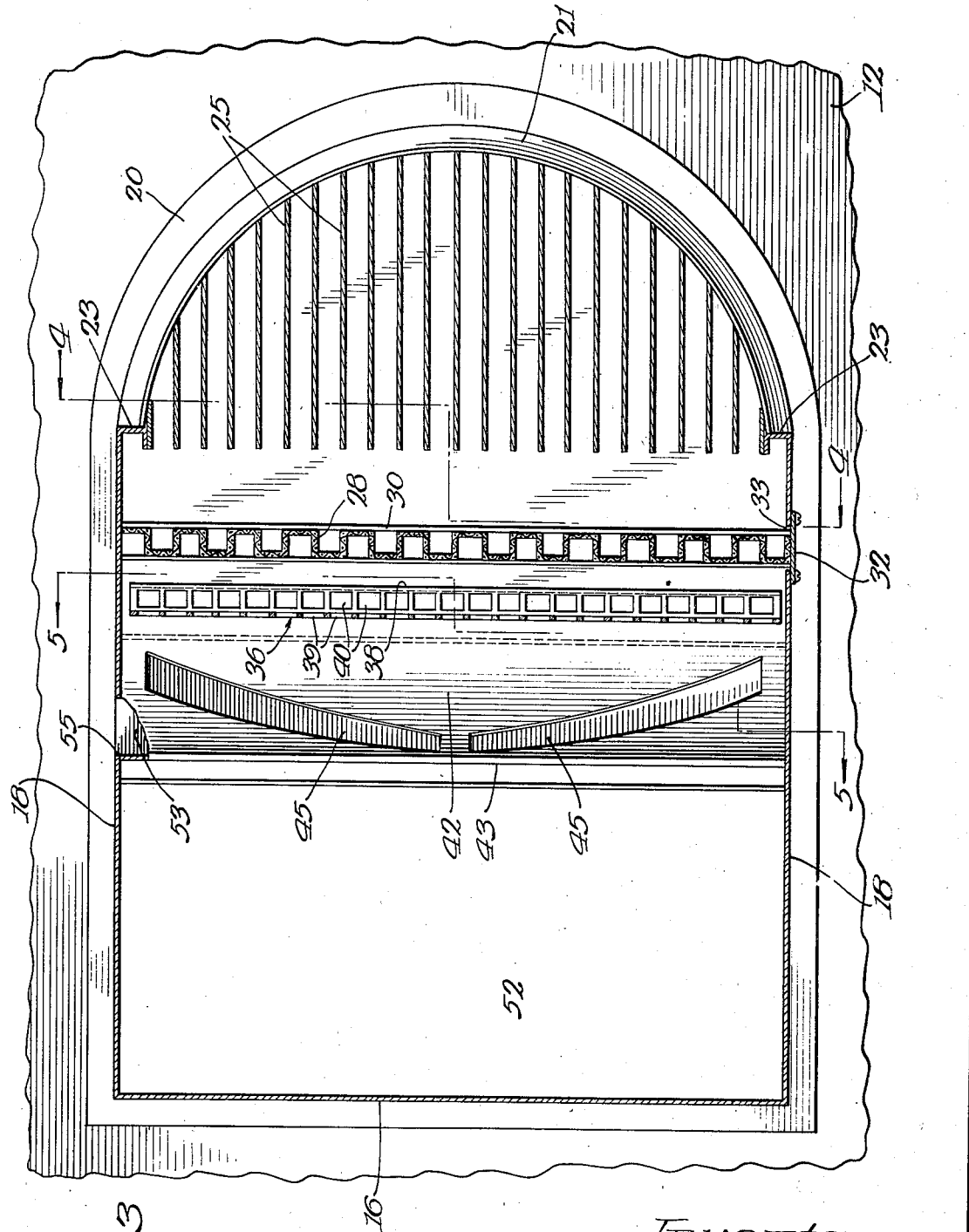
July 29, 1941. N. L. WILLER 2,250,614
VENTILATOR FOR MOVING VEHICLES
Filed Jan. 16, 1939   3 Sheets-Sheet 2
Inventor:
Nicholas L. Willer July 29, 1941.  N. L. WILLER  2,250,614
VENTILATOR FOR MOVING VEHICLES
Filed Jan. 16, 1939   3 Sheets-Sheet 3
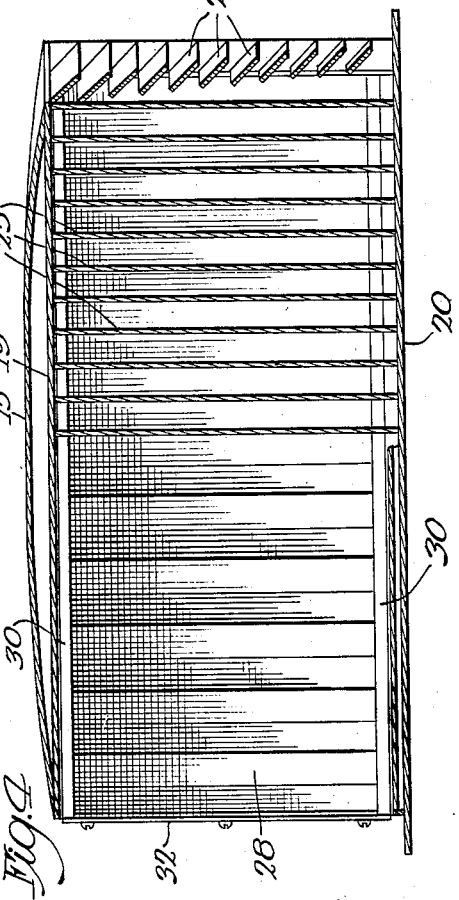
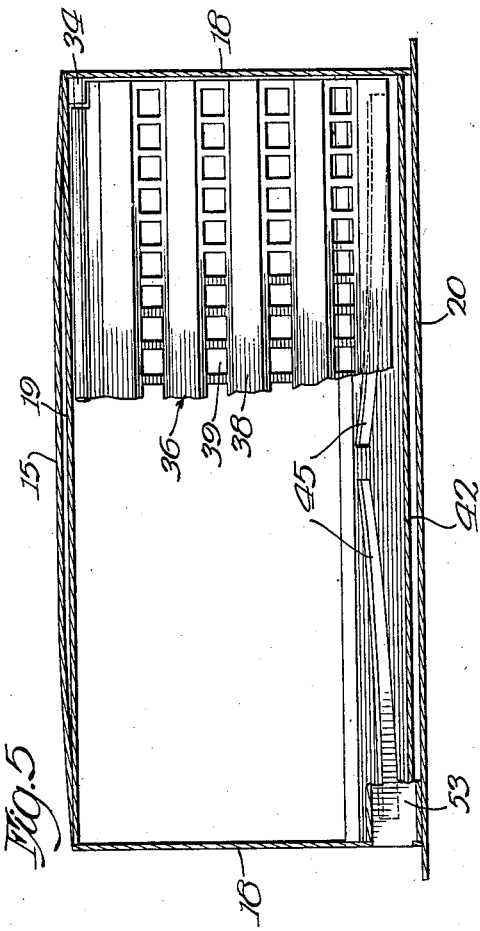
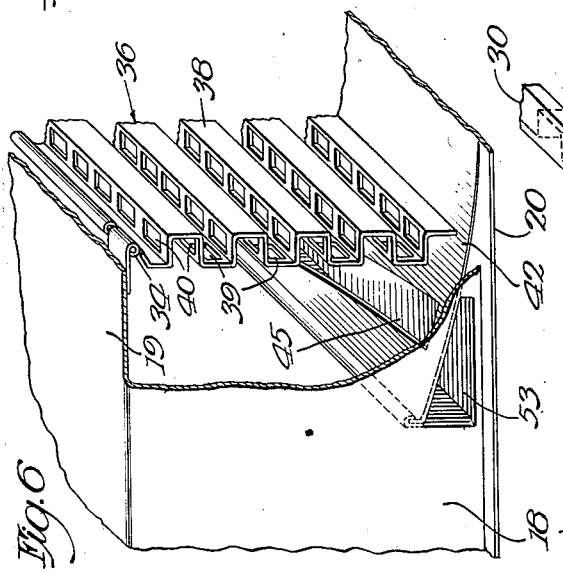
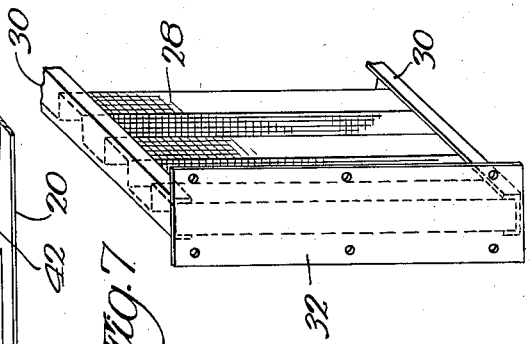
Inventor:
Nicholas L. Willer Patented July 29, 1941

UNITED STATES PATENT OFFICE 2,250,614

VENTILATOR FOR MOVING VEHICLES

Nicholas L. Willer, Chicago, Ill., assignor to Railway Utility Company, Chicago, Ill., a corporation of Illinois Application January 16, 1939, Serial No. 251,093

6 Claims. (Cl. 98—13)

My invention relates to ventilators and is especially adapted for use on moving vehicles such as street cars, omnibuses, railway cars, etc.

A particular object of my invention is to provide a ventilator which will give substantially uniform, draftless ventilation under varied conditions of air pressure, regardless of the speed of the vehicle or the force of the wind, and will filter out extraneous matter such as dust, trash, etc.

Another object is to provide in a ventilator a damper mechanism which is automatically operable to by-pass to the outer air a portion of the air entering the ventilator, the amount so by-passed varying according to the velocity of the entering air.

Another object is to provide a ventilator of the type referred to which is comparatively simple and inexpensive in construction, certain in operation and generally satisfactory for the purposes desired.

Referring now to the drawings forming a part of this specification and illustrating a preferred embodiment of my invention:

Fig. 1 is a side elevational view of a ventilator embodying my invention shown mounted on the top of a vehicle, the upper portion of the vehicle being shown fragmentarily and in elevation;

Fig. 2 is a longitudinal sectional view of the same;

Fig. 3 is a sectional view taken substantially along the line 3—3 of Fig. 2;

Figs. 4 and 5 are sectional views taken substantially along the lines 4—4 and 5—5, respectively, of Fig. 3;

Fig. 6 is a perspective view of the interior of my improved ventilator showing the damper mechanism, with parts broken away to show the construction more clearly; and Fig. 7 is a detailed perspective view of a filter which is an element of the ventilator shown in the other figures.

Numeral 10 represents a vehicle such as a street car, omnibus, or the like, on the roof 12 of which, preferably adjacent the rear end 13, is mounted a ventilator V embodying my invention.

The ventilator comprises an outer shell having a top wall 15 which slopes backwardly and downwardly to form a rear wall 16, side walls 18, 18, and a bottom wall 20. A plate 19 forming a false ceiling is mounted within the shell in substantially horizontal position as shown best in Fig. 2, the top wall 15 being arranged thereabove in sloping position in order to prevent eddying or turbulence of air.

A plurality of parallel vanes 21 is arranged in the front portion of the ventilator to serve as louvers, these vanes extending from the front of the ventilator a substantial distance around the sides as seen best in Fig. 1. The vanes 21 are arranged in slanting position so that air will be forced upwardly in entering the ventilator and into the relatively small channels between the vanes 21, thus reducing the velocity of the air. The vanes 21 are secured at their ends as by welding, brazing, or the like to the side walls 18, 18, these walls being angularly bent to provide U-shaped portions 23 at the front ends thereof (see Fig. 3) to which the vanes 21 are secured.

A plurality of plates 25 is arranged in substantially vertical parallel relation in the front portion of the ventilator (Fig. 3) to provide longitudinal channels, these plates 25 being secured as by welding, brazing or the like to the bottom wall 20, the wall 19 and the vanes 21.

As seen best in Figs. 1 and 2, the rear edges of the vanes 21 are arranged in a downwardly and forwardly sloping line rather than in a vertical line and the rear edges 26 of the plates 25 slope correspondingly.

It will be seen that, due to the arrangement of the louvers formed by the vanes 21 and of the plates 25, the air entering the ventilator is forced first through a plurality of narrow upwardly extending channels and then the currents thus formed are broken into a plurality of relatively narrow currents by means of the plates 25, all the air excepting that which enters immediately at the front being likewise caused to change direction in a horizontal plane. Thus, any air entering from the side is not only forced upwardly but is then given an abrupt change in direction toward the rear when it strikes the plates 25.

Arranged rearwardly of the plates 25 is a screen or filter 28. This screen is preferably folded in a sinuous or serpentine formation, as seen best in Figs. 3 and 7, the top and bottom edges thereof being secured to channel members 30, 30. These channels may be attached at one side to a plate 32 which may be secured to the side wall 18 as by screws or the like, a slot 33 being provided in the wall for that purpose, thus permitting convenient assembly of the screen 28 and convenient removal for cleaning.

Hingedly carried by the top wall 19 as at 34, rearwardly of the screen 28, is a damper member 36. This damper is likewise folded sinuously, but at right angles to the folds of the screen 28, the damper having horizontal folds whereas the screen has vertical ones. As seen in Figs. 2 and 6, the major portion of the surface of the damper member is perforated, the front vertical surfaces 38 being solid while the rear vertical surfaces 39 and the horizontal surfaces 40 are perforated.

A plate 42 which is arcuate in longitudinal section is secured to the bottom wall 20 and to an angular member 43 carried thereby (Figs. 2 and 6), this plate 42 being formed in substantially a circular arc having its center at the pivot 34 and spaced a slight distance below the lower edge of the damper 36. This plate 42 is provided with slots 45, 45 therein. The slots 45, as seen best in Fig. 3, extend from the sides toward the rear and center preferably in arcs which narrow toward the rear.

Rearwardly of the damper 36 is a substantially unobstructed air chamber 50 leading to the interior of the vehicle body. It is not important, so far as my invention is concerned, just how the air is conveyed from the chamber 50 to the vehicle body, but in the preferred arrangement the air is conducted from the chamber 50 through a passage 52 which may be either in the top or along the sides of the vehicle body, from which space 52 the air is admitted through a grill or the like (not shown) into the vehicle body.

Summarizing, now, with regard to the operation of my improved ventilator: The air enters the passages formed by the louvers 21 and is broken by the plates 25 into longitudinal streams and is further broken up and its velocity further reduced by the screen 28 and it is here cleaned of dust and debris. When the air meets the damper 36, if it is not of great force beyond a predetermined velocity, the damper will not move, and the air will pass under the damper 36 and through the apertures 39 and 40 thereof and thence through the chambers 50 and 52 into the vehicle body. Very little air will escape through the slots 45 to the outside because of the outer air resistance. It will be seen that by the time the air has been repeatedly broken up and and has changed direction because of the tortuous path provided by the various elements of my ventilator, it will be substantially impossible to produce a strong draft flowing into the vehicle body.

In the event that the current of air meeting the damper 36 is in excess of the predetermined value required to move the damper, then the latter will swing about its pivot 34, as shown in dotted lines in Fig. 2, in an arc substantially parallel to the plate 42, the length of the arc in which the damper swings varying according to the strength or velocity of the air current. As the damper swings about its pivot, more and more of the area of the slots 45 will be uncovered by the damper, so that the major portion of the air will escape through the slots 45 down into the chamber 53 below the slots and out into the open air through openings 55 provided in the side wall 18 of the ventilator. It will be seen that the greater the velocity of the air the greater will be the arc of swing of the damper, until when the damper is swung to its extreme position as shown dotted in Fig. 2, substantially no air is permitted to flow under the damper and the only air which can enter the vehicle body is that which flows in a tortuous path through the apertures in the ventilator. At all times, the area of the slots 45 exposed by the swing of the damper will be greater or less according to the velocity of the air striking the damper, thus automatically controlling the amount of air by-passed according to the velocity of the admitted air.

Thus, it will be seen that, regardless of how strong may be the current of air flowing into the ventilator, it will be substantially impossible for a strong draft to pass into the vehicle body, in view of the tortuous path which the air is required to move and the by-passing of portions of the air to the outside by means of the swinging damper.

A false shell 60 adjoining the shell of the ventilator proper may be provided rearwardly thereof, as shown in Fig. 1, this shell 60 being tapered not only to produce a "streamlined" appearance but also serving to prevent eddying and turbulence of the air around the rear of the ventilator and thus reducing whatever air friction might otherwise be caused by having the ventilator on the roof of the vehicle.

Various changes, modifications and variations may suggest themselves to those skilled in the art without departing from the spirit of my invention, and hence I do not wish to be restricted to the specific form shown or uses mentioned except to the extent indicated in the appended claims, which are to be interpreted as broadly as the state of the art will permit.

I claim:

1. In a ventilator having an inlet opening and also having an outlet opening leading to the space to be ventilated, means for tending to reduce the introduction of drafts into the body to be ventilated, said means comprising a damper pivoted at its upper end, said damper comprising a sheet member having convolutions therein and being partially perforated, a plate curved substantially concentrically with the pivot of said damper and spaced a slight distance therebelow, said plate having apertures therein leading outside of said space, said apertures being so arranged that the greater the swing of said damper the greater will be the area of the apertures uncovered by the damper so as to permit by-passing of air to the outside according to the velocity of admitted air, the ventilator having a substantially unrestricted passage beyond the damper leading to the body to be ventilated.

2. In a ventilator, a casing having an opening for the admission of air and an outlet opening leading into the space to be ventilated and also having a by-pass opening leading outside of said space, a movable member disposed in advance of said outlet and by-pass openings and functioning in its normal position to permit a restricted quantity of air to flow past it to escape through said outlet and by-pass openings, said movable member comprising a corrugated plate having perforated and unperforated areas substantially uniformly distributed throughout its entire extent and being hinged at its upper end to permit substantially free movement more or less proportionate to the air pressure thereon so as to expose more of said by-pass opening as the velocity of the admitted air increases, the ventilator having a substantially unrestricted passage beyond the damper leading to the body to be ventilated.

3. In a ventilator having an inlet opening communicating with the outer air and having an outlet opening leading to the space to be ventilated, an air receiving portion and an air discharging portion, means tending to reduce the introduction of drafts into the space to be ventilated, said means comprising a free-swinging damper pivoted at its upper end between said portions, said damper having perforated and unperforated portions, means for limiting movement of said damper without substantially restricting passage of air therethrough, whereby the damper permits passage of air therethrough in all positions thereof while always offering substantial resistance to an air current, and means for by-passing air from the ventilator to the outer air, said by-pass having an inlet arranged beyond said damper in the direction of air flow, said damper operating to uncover more of said by-pass inlet as the air admitted to the ventilator increases in velocity, the ventilator having a substantially unrestricted passage beyond the damper leading to the body to be ventilated.

4. In a ventilator having an inlet opening communicating with the outer air and having an outlet opening leading to the space to be ventilated, an air receiving portion and an air discharging portion, means tending to reduce the introduction of drafts into the space to be ventilated, said means comprising a free-swinging damper pivoted at its upper end between said portions, said damper having perforated and unperforated portions substantially uniformly distributed throughout its entire extent, means for limiting movement of said damper without substantially restricting passage of air therethrough, whereby the damper permits passage of air therethrough in all positions thereof while always offering substantial resistance to an air current, and means for by-passing air from the ventilator to the outer air, said by-pass having an inlet arranged beyond said damper in the direction of air flow, said damper operating to uncover more of said by-pass inlet as the air admitted to the ventilator increases in velocity, the ventilator having a substantially unrestricted passage beyond the damper leading to the body to be ventilated.

5. In a ventilator having an inlet opening communicating with the outer air and having an outlet opening leading to the space to be ventilated, an air receiving portion and an air discharging portion, means tending to reduce the introduction of drafts into the space to be ventilated, said means comprising a free-swinging damper pivoted at its upper end between said portions, said damper having perforated and unperforated portions, means for limiting movement of said damper without substantially restricting passage of air therethrough, whereby the damper permits passage of air therethrough in all positions thereof while always offering substantial resistance to an air current, and means for by-passing air from the ventilator to the outer air, said by-pass having an inlet arranged beyond said damper in the direction of air flow, said damper operating to uncover more of said by-pass inlet as the air admitted to the ventilator increases in velocity, and said by-pass inlet comprising a slot disposed obliquely and transversely in a wall opposite the pivoted end of said damper, whereby the greater the swing of said damper the greater will be the volume of by-passed air without excessively increasing the volume of air admitted to said space, the ventilator having a substantially unrestricted passage beyond the damper leading to the body to be ventilated.

6. In a ventilator having an inlet opening communicating with the outer air having an outlet opening leading to the space to be ventilated, an air receiving portion and an air discharging portion, means tending to reduce the introduction of drafts into the space to be ventilated, said means comprising a free-swinging damper pivoted at its upper end between said portions, said damper having perforated and unperforated portions substantially uniformly distributed throughout its entire extent, means for limiting movement of said damper without substantially restricting passage of air therethrough, whereby the damper permits passage of air therethrough in all positions thereof while always offering substantial resistance to an air current, and means for by-passing air from the ventilator to the outer air, said by-pass having an inlet arranged beyond said damper in the direction of air flow, said damper operating to uncover more of said by-pass inlet as the air admitted to the ventilator increases in velocity, and said by-pass inlet comprising a slot disposed obliquely and transversely in a wall opposite the pivoted end of said damper, whereby the greater the swing of said damper the greater will be the volume of by-passed air without excessively increasing the volume of air admitted to said space, the ventilator having a substantially unrestricted passage beyond the damper leading to the body to be ventilated.

NICHOLAS L. WILLER.